(12) United States Patent
Bastian

(10) Patent No.: US 6,905,158 B1
(45) Date of Patent: Jun. 14, 2005

(54) TAILGATE POCKET STEP

(76) Inventor: Bradley Bastian, 1990 Bastian Ct., Lakeport, CA (US) 95453

(*) Notice: Subject to any disclaimer, the term of this patent is extended or adjusted under 35 U.S.C. 154(b) by 0 days.

(21) Appl. No.: 10/831,453

(22) Filed: Apr. 23, 2004

(51) Int. Cl.[7] .............................................. B62D 33/03
(52) U.S. Cl. ..................................... 296/62; 280/164.1
(58) Field of Search .............................. 296/51, 62, 61; 280/164.1

(56) References Cited

U.S. PATENT DOCUMENTS 6,095,587 A * 8/2000 Shirlee et al. ................. 296/61
6,454,338 B1 * 9/2002 Glickman et al. ............ 296/62
2002/0070577 A1 * 6/2002 Pool et al. ..................... 296/62
2004/0113450 A1 * 6/2004 Fielding ......................... 296/62

* cited by examiner

*Primary Examiner*—Jason Morrow
(74) *Attorney, Agent, or Firm*—Craig M. Stainbrook; Larry D. Johnson; Johnson & Stainbrook, LLP

(57) ABSTRACT

A tailgate pocket step including a pocket step box and a pocket step assembly slidably insertable into the pocket step box. The step assembly includes a planar plate and a hinged platform that lies in the plane of the plate when the step assembly is in the stored position and angle outwardly to form a step when the step assembly is in the deployed position.

13 Claims, 10 Drawing Sheets

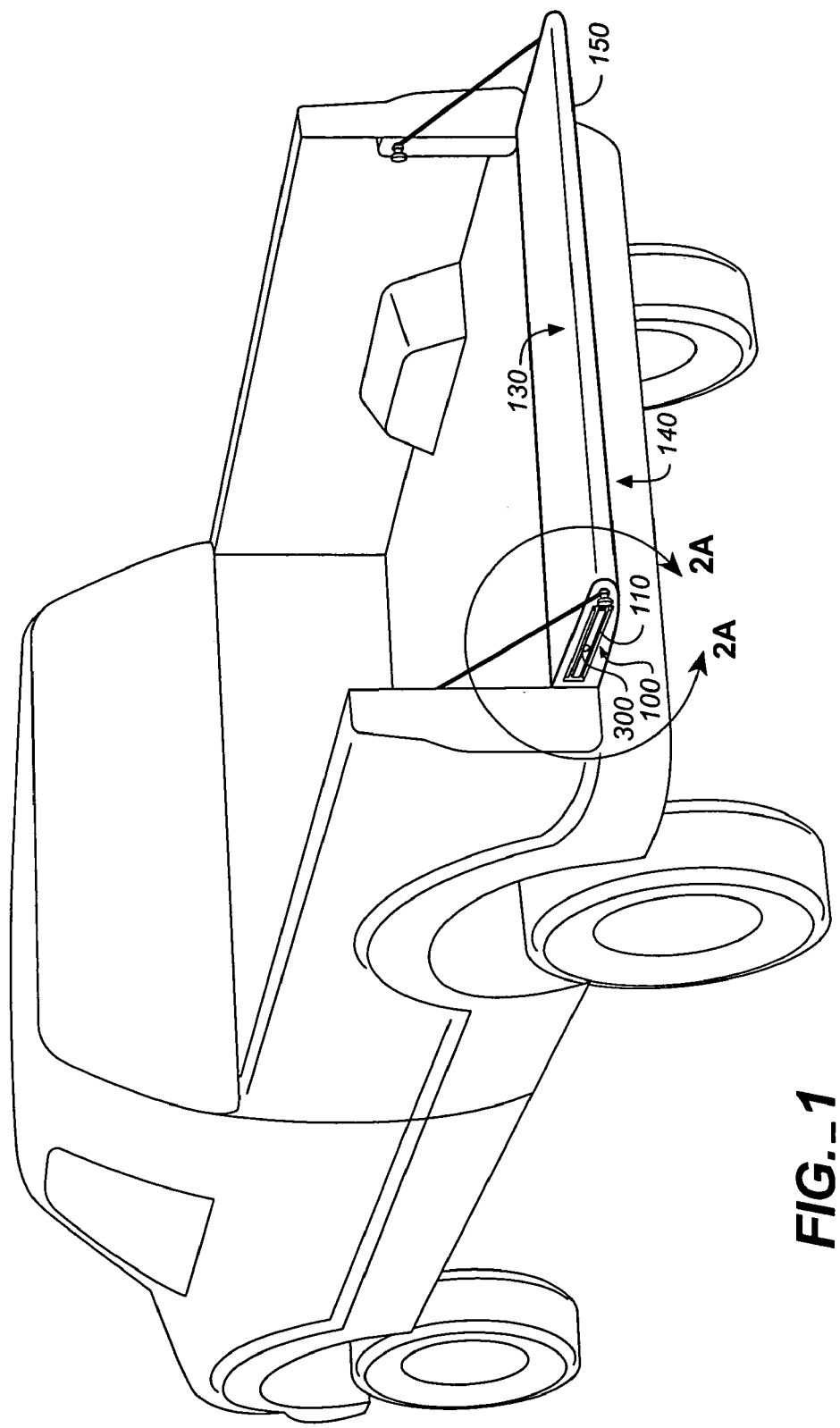
FIG._1

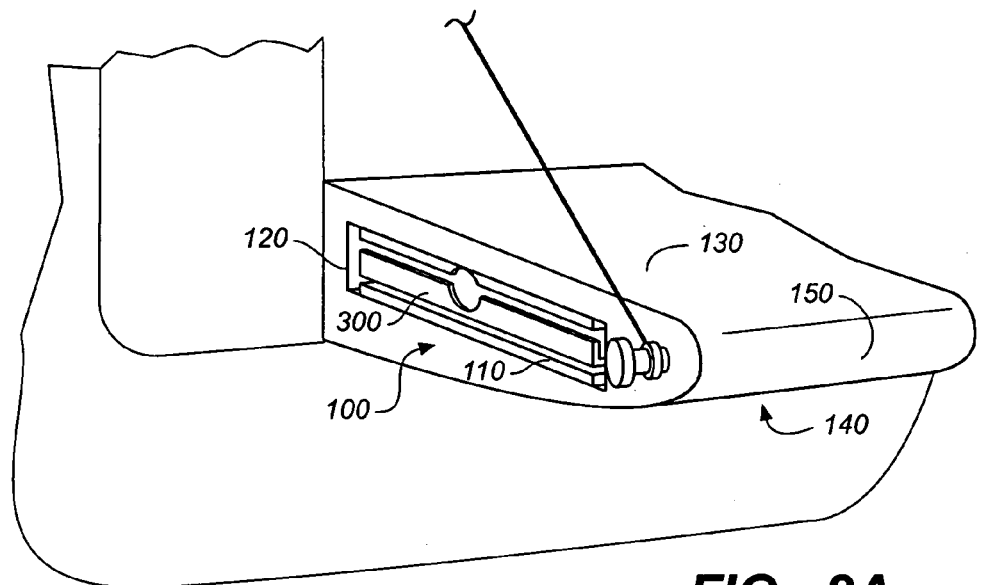
FIG._2A
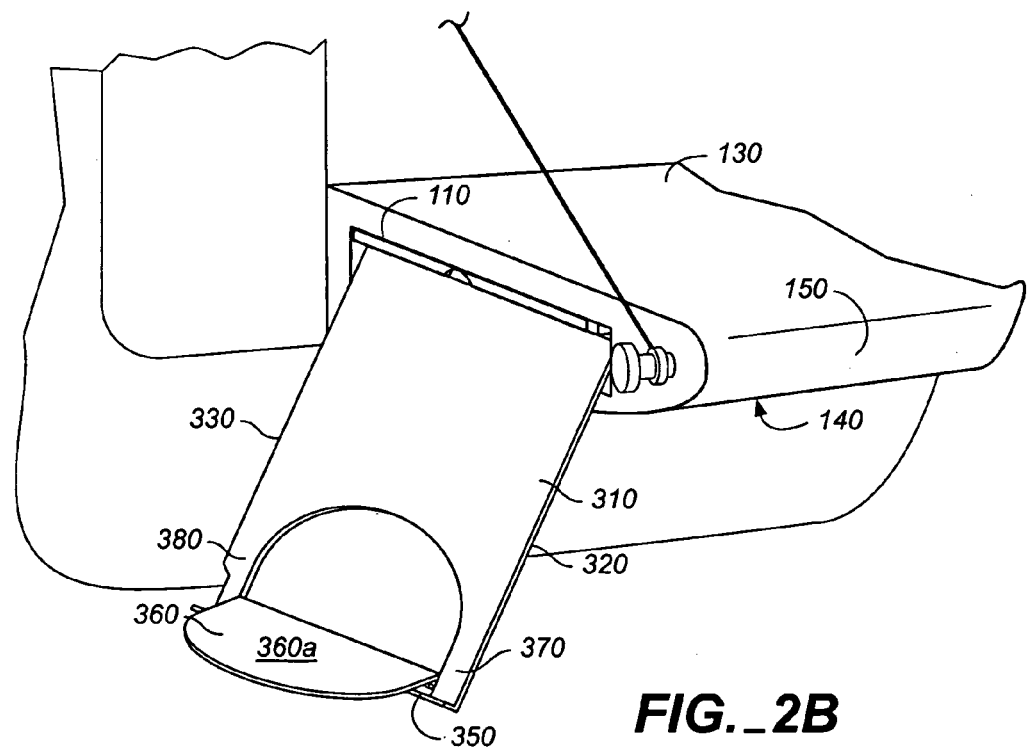
FIG._2B

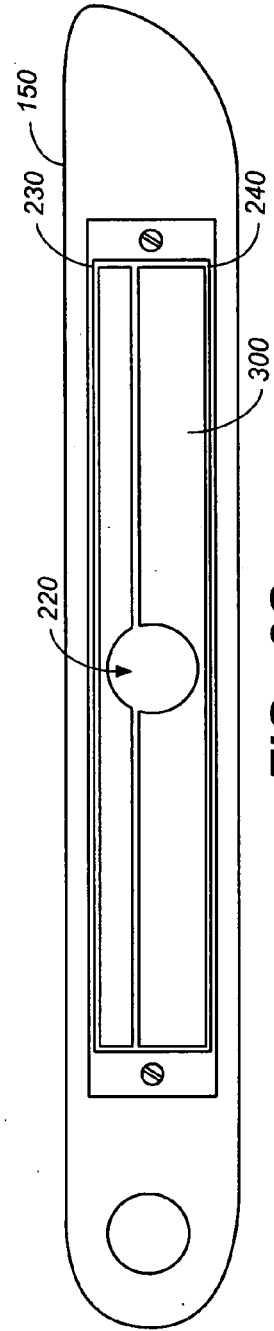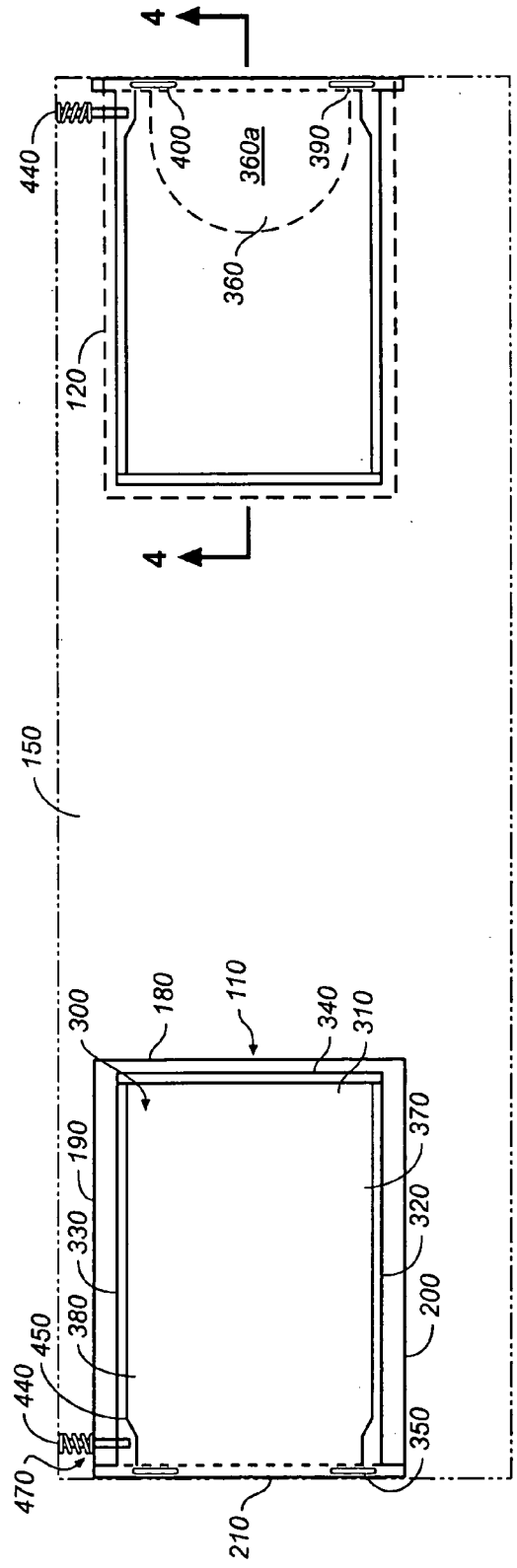

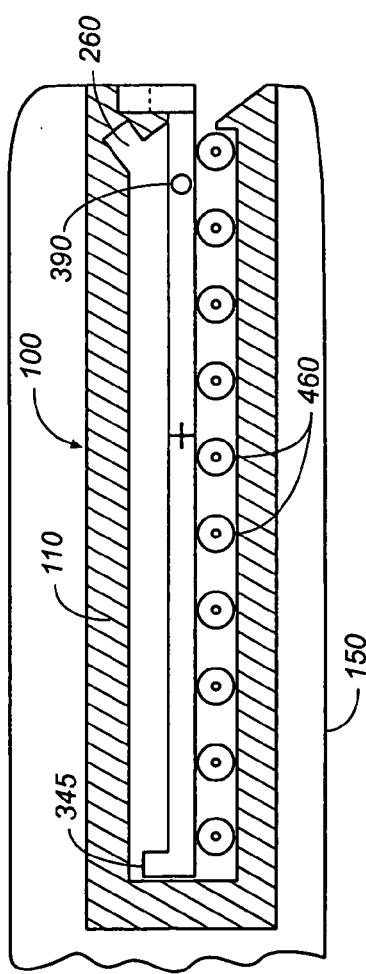
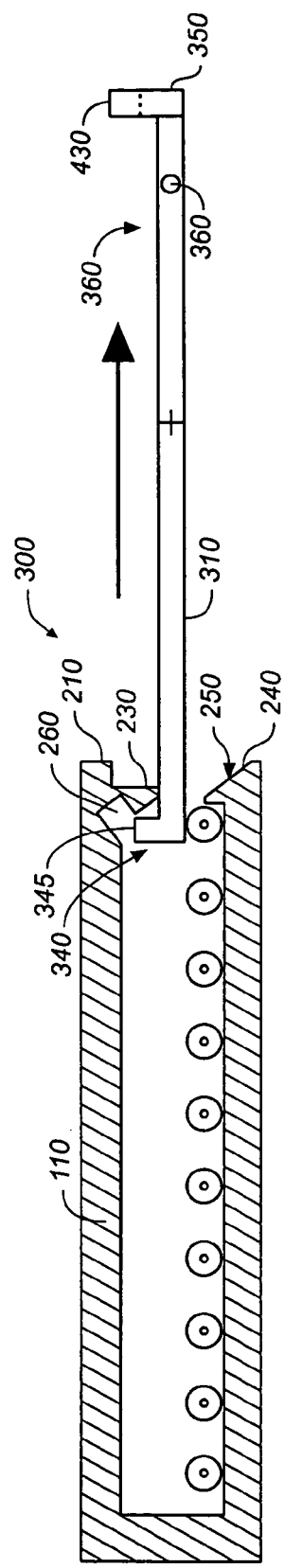
*FIG._4*
*FIG._5*

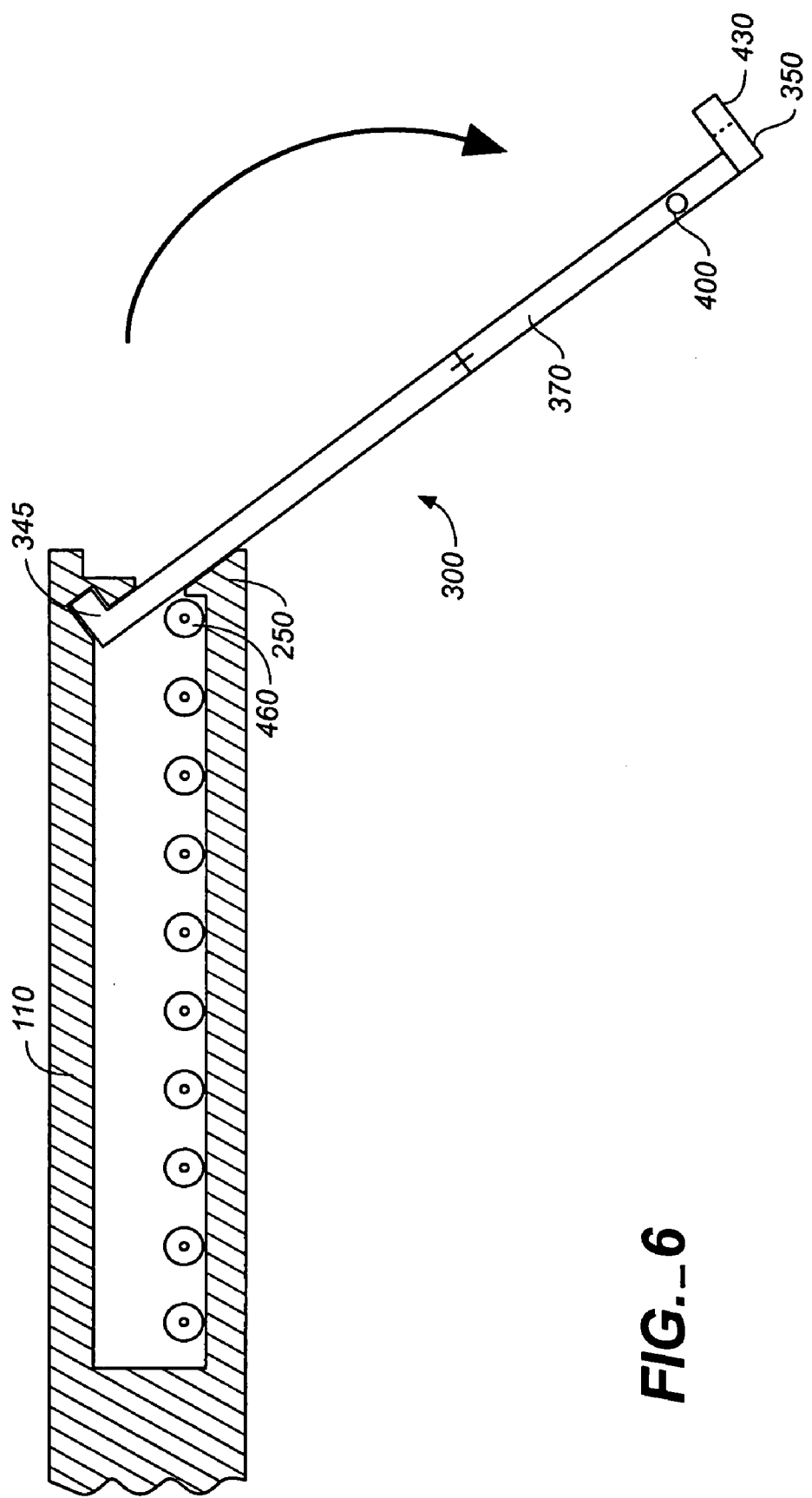
FIG._6

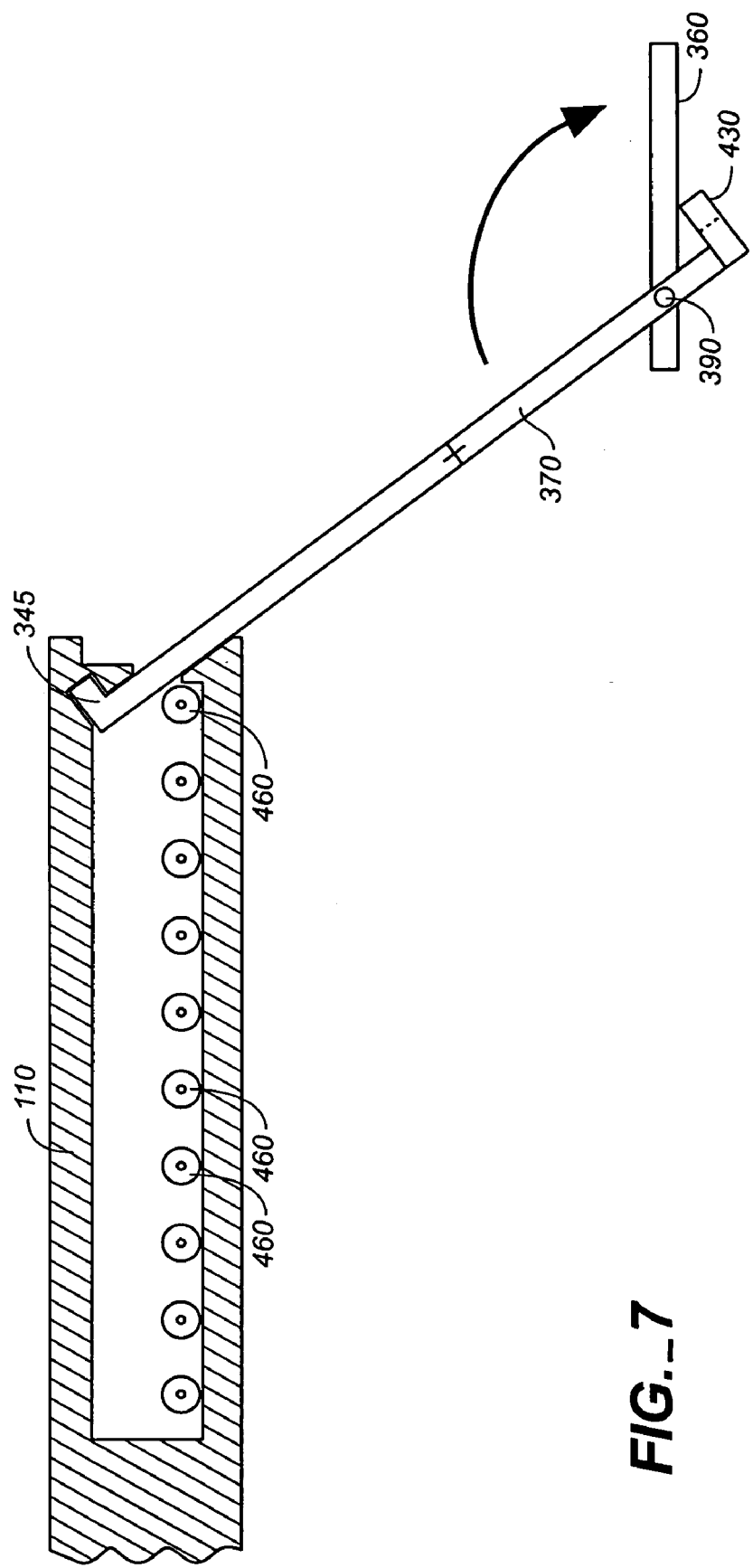
FIG._7

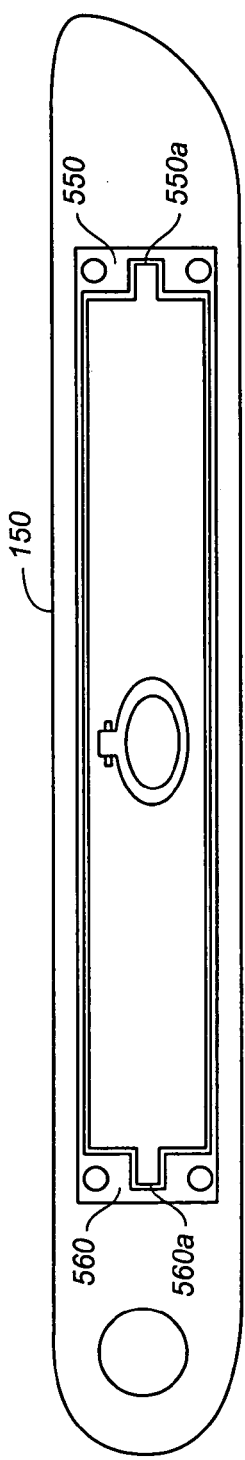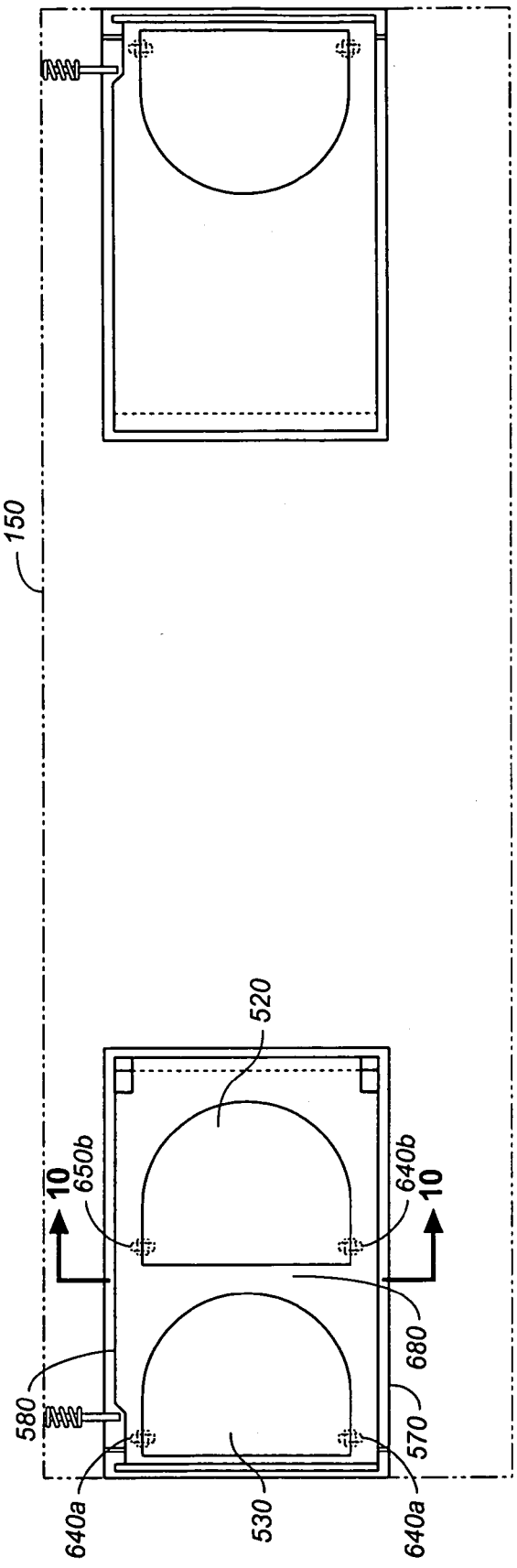
FIG._8
FIG._9

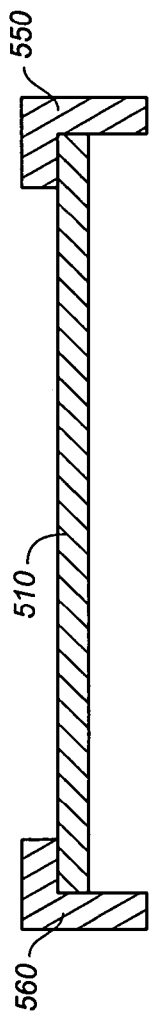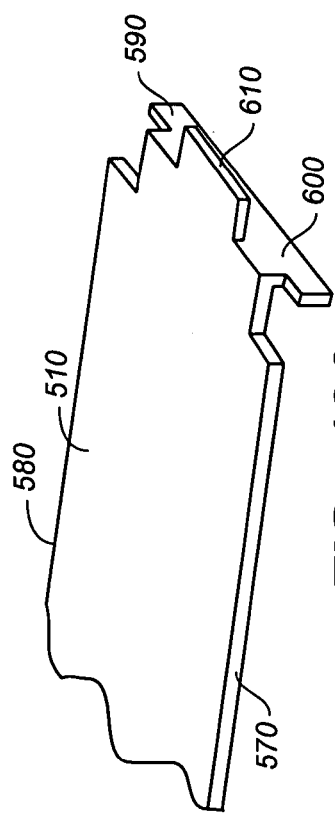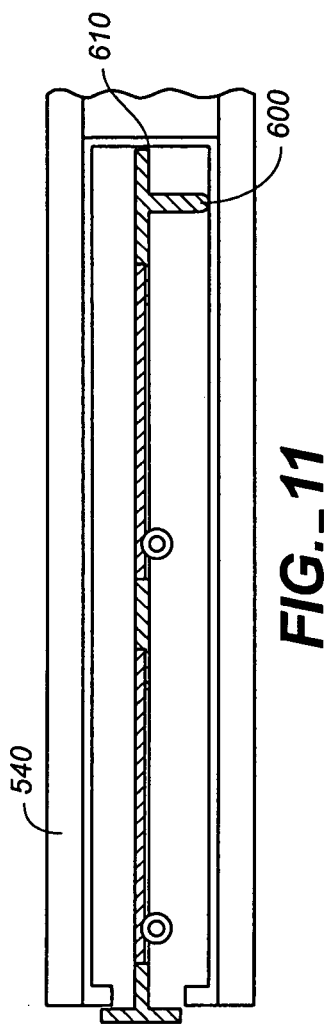

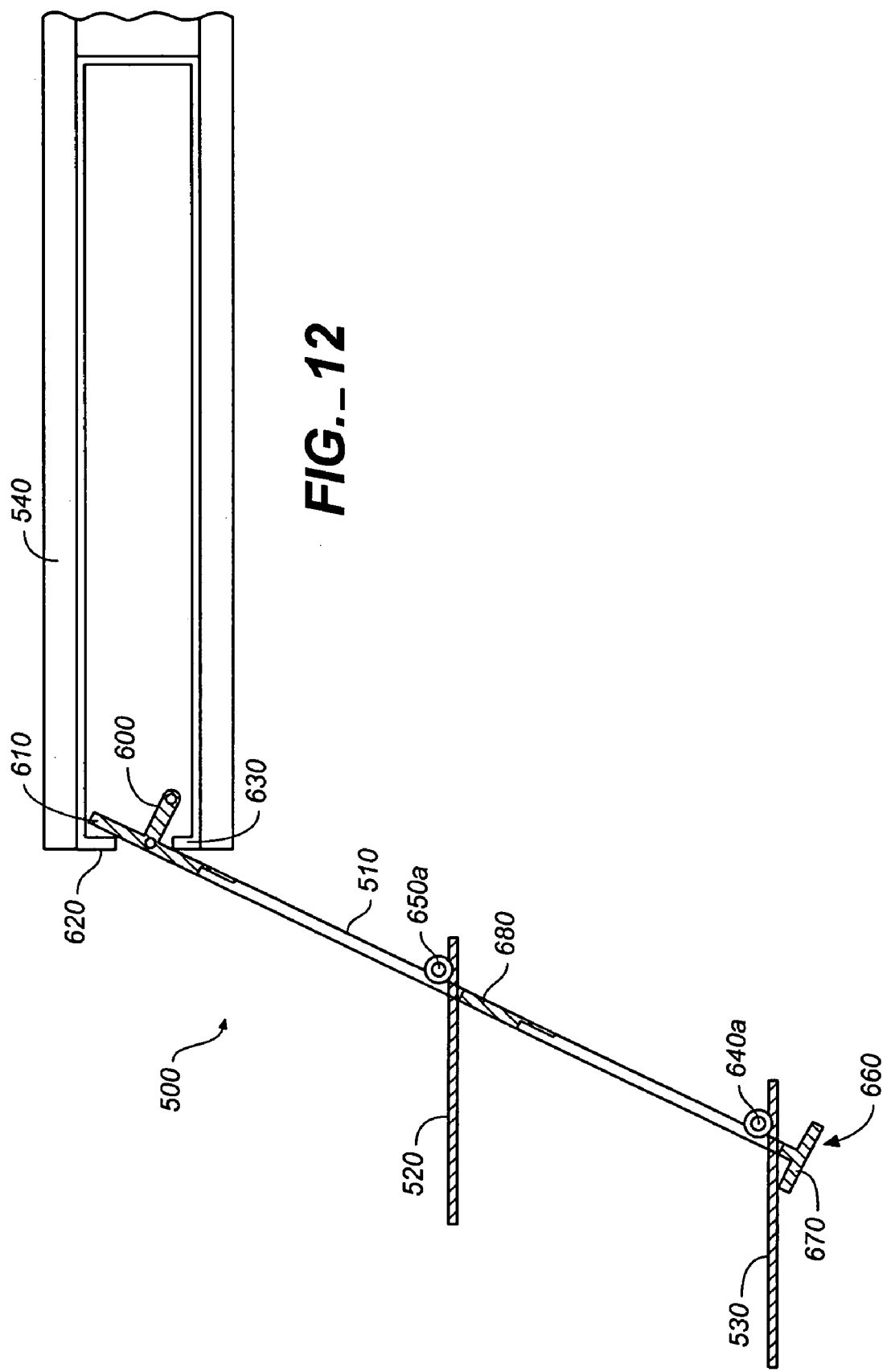

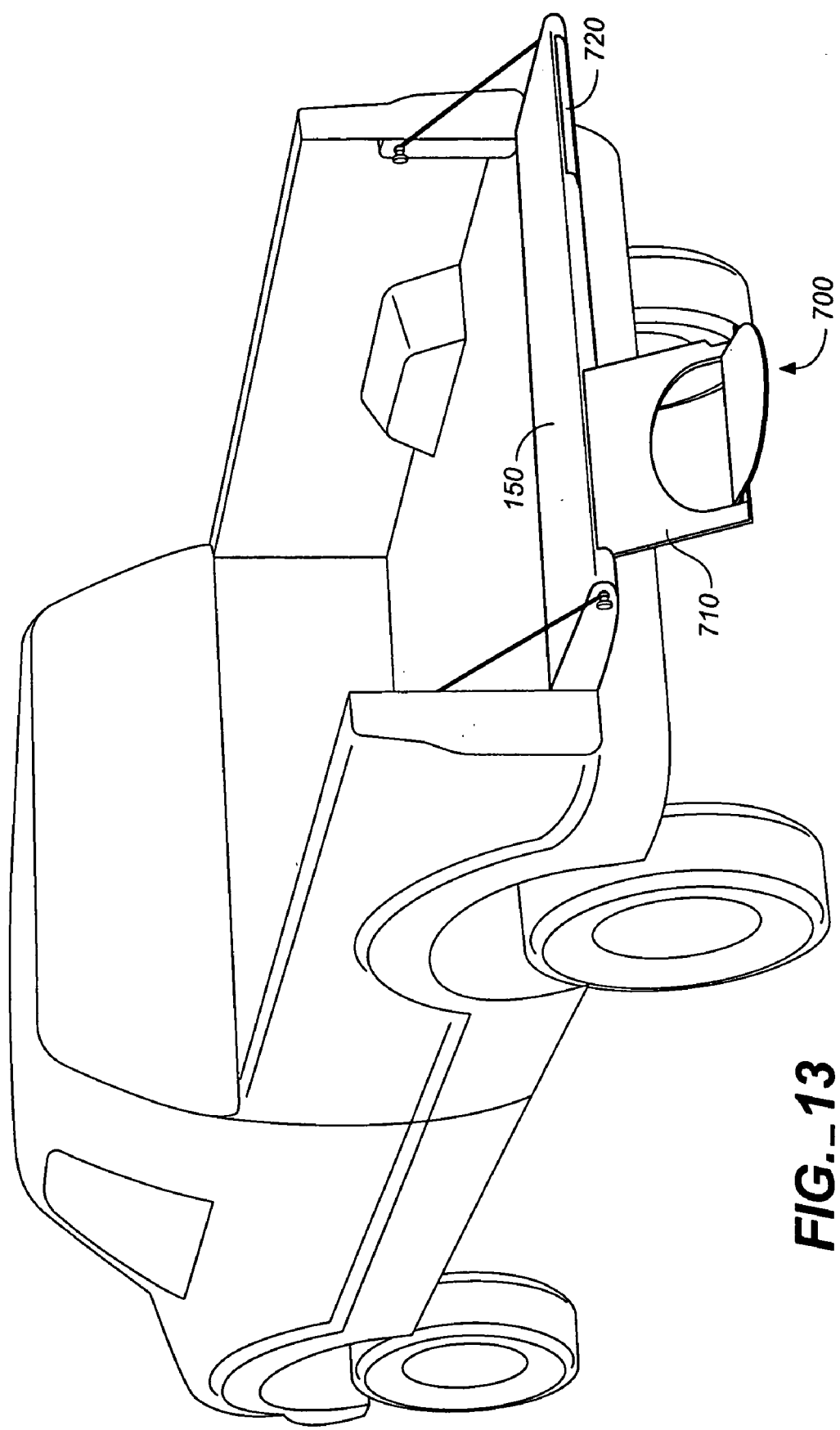
FIG._13

TAILGATE POCKET STEP

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to automobiles, and more particularly to tailgates and tailgate accessories, and still more particularly to a pickup truck tailgate pocket step assembly adapted for insertion into, and deployment from, the side of the tailgate.

BACKGROUND INFORMATION AND DISCUSSION OF RELATED ART

The cargo bed of a pickup truck, whether on a small and lightweight truck or a heavy-duty hauling truck, is considerably elevated above the ground. This is especially true for trucks with heavy duty suspension systems and trucks equipped for off-road performance. Access to the cargo bed is typically provided by a tailgate of some kind, and most often a tailgate that folds down into a position substantially coplanar with the floor of the cargo bed. This facilitates loading and unloading cargo from the truck, but it also creates a high step as the only practical means to get into the cargo bed physically to carry, place, move, adjust, secure, or remove a load. Except for the young and nimble who derive some measure of satisfaction from being able to spring onto the tailgate, most users prefer to get into the cargo bed without the need of macho gymnastics. And even the most nimble need occasional assistance lifting a load onto the tailgate.

Accordingly, it is desirable to have a step or steps to assist in mounting a tailgate for entering the cargo bed area of a pickup truck. However, it is inconvenient and space-consuming to haul around a small ladder or some other kind of portable step. It is therefore more desirable to have an auxiliary step somehow integrated into the truck's exterior. This need has been appreciated and a number of devices have been proposed to address the need. The following United States patents and published patent applications are exemplary.

U.S. Pat. No. 4,639,032 to Barbour, teaches a retractable step that can be either retrofitted to a standard pickup truck type tail gate or can be incorporated into the tail gate during manufacture. If installed at the time of manufacture, the step is of the "disappearing type" and is not visible except when extended and folded down for use. This is accomplished through a track and pivot arrangement with the retrofit version having a housing in which the step is enclosed when in the retracted position.

U.S. Pat. No. 5,820,193 to Straffon, discloses a self-storing step for use with a truck tailgate. The self-storing step deploys from the top of a tailgate under the force of gravity when the tailgate swings from an upright and closed position to an open and downwardly disposed orientation. The assembly is particularly well-suited for military vehicles and is, accordingly, assigned to the United States as represented by the Secretary of the Army. The structure includes an auxiliary step associated with a permanent step disposed on the tailgate. The auxiliary step has a pair of spaced parallel legs disposed with their axes normal to the hinged edge of the tailgate and lying within the plane defined by the tailgate. The parallel legs lie one on each side of the permanent step located on the tailgate so as to bracket the permanent step. The parallel legs have a first end with a stop that cooperates with the tailgate or associated bracket to allow the parallel legs to move longitudinally but to prevent the legs from separating from the tailgate. A cross arm extends between the second ends of the parallel legs with one end attached to each end of the parallel legs to form a step.

U.S. Pat. No. 6,454,338 to Glickman et al, shows an integrated tailgate extender for a vehicle with a flat cargo bed. The tailgate has a closed vertical position and an open horizontal position, and a tailgate extension slideably received by the tailgate that may be extended to a substantially horizontal position when the tailgate is in the open position. The extender can be rotated upwardly to extend the cargo bed or downwardly to provide a load starter or step assist.

U.S. patent application Ser. No. 2002/0070577 discloses a step apparatus integrated into a tailgate and comprising a tailgate with a step deployable from the top of a tailgate. The step is operably concealed within a tailgate which has parallel interior channels and moves on a frame assembly that slides within the parallel channels. It may be extended and then pivoted to provide steps positioned beyond the top edge of the open tailgate. One or more steps may be provided.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein. Additionally, the prior art devices include limitations and disadvantages that invite improvement. Specifically, the prior art designs are all adapted for incorporation into the top of a tailgate. This positioning interferes with the latch assembly, also located in the top, and it limits and possibly prohibits use of the apparatus when the truck has a trailer attached. Furthermore, the auxiliary step devices in the prior art do not provide any hand holds for a user.

BRIEF SUMMARY OF THE INVENTION

In view of the foregoing, and to address the unfulfilled needs indicated above, it is an object of the present invention to provide a tailgate pocket step suited for installation either at the time of manufacture or as an aftermarket retrofit apparatus. The step deploys from the side of the tailgate or the side of the top of the tailgate, and therefore provides advantages hitherto not provided in the prior art.

It is a further object of the present invention to provide a new and improved tailgate pocket step that facilitates use of the cargo bed sides as a handhold during use.

It is another object of the present invention to provide a new and improved tailgate pocket step that does not interfere with conventional tailgate latch assembly.

Still another object or feature of the present invention is a new and improved tailgate pocket step that allows for use from the side of a truck.

An even further object of the present invention is to provide a novel tailgate pocket step that can be installed in both sides of a tailgate.

The tailgate pocket step of the present invention improves on the art in several respects. First, it provides an apparatus that is incorporated into the side of a tailgate, rather than the top. Accordingly, it does not interfere with latching mechanisms and handles that are generally located in the top and middle of the tailgate. Second, it is proximate the side panel of the pickup truck cargo bed, and therefore allows the user to hold onto the side of the truck while mounting the step. Prior art devices, all of which are shown installed in the top of the tailgate, do not facilitate such a handhold. Third, the present invention will not interfere with a trailer attached to a hitch on the pickup truck. Prior art devices located in the top middle of the tailgate could not be used with a trailer hitched to the truck.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trade-mark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL
VIEWS OF THE DRAWINGS

The invention will be better understood and objects other than those set forth above will become apparent when consideration is given to the following detailed description thereof. Such description makes reference to the annexed drawing wherein:

FIG. 1 is a perspective view showing the tailgate pocket step of the present invention installed and incorporated into the side of a pickup truck tailgate;

FIG. 2A is a detailed view of the pocket step shown in FIG. 1;

FIG. 2B is a detailed view showing the step of FIG. 2A when deployed;

FIG. 2C is an end view in elevation of the pocket step of FIGS. 2A and 2B;

FIG. 3 is a cross-sectional top plan view showing the first preferred embodiment of the inventive tailgate pocket step installed in both sides of a tailgate;

FIG. 4 is a cross-sectional side view in elevation along the lines shown in FIG. 3, and showing the tailgate pocket step in a stored position;

FIG. 5 is a cross-sectional side view in elevation showing the step in an extended position;

FIG. 6 is a cross-sectional side view in elevation showing the step fully deployed, or in an extended and downwardly angled position;

FIG. 7 is a cross-sectional side view in elevation showing the step fully deployed;

FIG. 8 is an end view in elevation showing a second preferred embodiment of the present invention, and particularly showing alternative slide means for extending and deploying the step portion of the pocket step and alternative gripping means;

FIG. 9 is a cross-sectional top plan view illustrating a second preferred embodiment of the inventive pocket step;

FIG. 10 is a cross-sectional end view along the section lines indicated in FIG. 9;

FIG. 10A is a perspective view showing the configuration of the step portion of the second preferred embodiment of the pocket step, adapted for storage and extension in channels;

FIG. 11 is a cross-sectional side view in elevation of the second preferred embodiment of the tailgate pocket step;

FIG. 12 is a cross-sectional side view in elevation showing the second preferred embodiment fully deployed; and FIG. 13 is a perspective view showing the first preferred embodiment of the inventive apparatus installed and deployed from the top side of a tailgate.

DRAWING REFERENCE NUMERALS

FIGS. 1–7
100 first preferred embodiment of tailgate pocket step of present invention
110 pocket step box
120 cavity in tailgate
130 interior side of tailgate 140 exterior side of tailgate
150 tailgate
160 top side of pocket step box
170 bottom side of pocket step box
180 back side of pocket step box
190 inboard side of pocket step box
200 outboard side of pocket step box
210 front side of pocket step box
220 opening in front side 210
230 upper rim of front side
240 lower rim of front side
250 step support ramp
260 angled stop channel
300 step member assembly
310 plate
320 outer side of plate
330 an inner side of plate
340 interior end of plate
345 interior ledge
350 exterior end of plate
360 hinged platform
370 outer arm
380 inner arm
390 outer hinge
400 inner hinge
430 shelf
440 locking pin
450 surface structure to engage locking pin
460 rollers FIGS. 8–12
500 second preferred embodiment of the tailgate pocket step of the present invention
510 plate
520 first hinged platform
530 second hinged platform
540 pocket step box
550 outboard side of pocket step box
550a slot in outboard side
560 inboard side of pocket step box
560a slot in inboard side
570 planar outboard side of plate
580 planar inboard side of plate
590 interior end of plate
600 ledge
610 tab
620 upper rim
630 lower rim
640a,b outer hinges
650a,b inner hinges
660 outer end of plate
670 shelf
680 transverse bar
700 alternative installation of pocket step in tailgate top
710 first pocket step
720 second pocket step

DETAILED DESCRIPTION OF THE INVENTION

Referring to FIGS. 1 through 9, wherein like reference numerals refer to like components in the various views, there is illustrated therein a new and improved tailgate pocket step, generally denominated 100 herein. FIG. 1 illustrates a first preferred embodiment of the tailgate pocket step of the present invention installed and incorporated into the side of a pickup truck tailgate, while FIG. 2A is a more detailed view thereof. FIG. 2B is another perspective view showing the step fully deployed from the side of a tailgate. FIG. 3 is a cross-sectional top plan view showing the first preferred embodiment of the inventive tailgate pocket step installed in both sides of a tailgate. FIGS. 4–7 are cross-sectional side views in elevation showing the tailgate pocket step in a stored, extended, partly deployed, and fully deployed position, respectively. These views collectively show that the inventive apparatus 100 comprises a pocket step box 110, preferably hardened steel and adapted for incorporation into the cavity 120 defined by the panels or interior and exterior sides 130, 140 respectively, of a pickup truck tailgate 150. The pocket step box 110 is essentially a cuboid box that includes a top side 160, bottom side 170, back side 180, inboard side 190, outboard side 200, and front side 210. In contrast to all other sides, the front side includes an opening 220 defined by an upper rim 230 and lower rim 240. The lower rim comprises an integral angled extension of the bottom side and further includes a step support ramp 250 to support the deployed step and to define the angle at which the step is disposed when extended and deployed (see FIGS. 5–7). The upper rim comprises an integral angled extension of the top side which is substantially perpendicular to the top side and further encloses an angled stop channel 260 for capturing a portion of the step when deployed to retain the step and prevent it from full egress or removal from the pocket step box.

As will be appreciated by those with skill in the art, the pocket may be incorporated into a tailgate at the time of manufacture or installed as an aftermarket auxiliary apparatus. In either case, it is inserted into an opening provided in the tailgate and appropriately secured with welds, bolts, a combination of both, or other suitable means.

The tailgate pocket step of the present invention further includes a step member assembly 300 comprising a substantially planar plate 310 having an outer side 320, an inner side 330, an interior end 340, an interior ledge 345, an exterior end 350, and at least one hinged platform 360 which is coplanar with plate 310 when in the stored position (FIGS. 3–4) and which angles outwardly from the plate when in the deployed position to provide a step (FIG. 7). The planar plate includes outer and inner arms 370, 380, respectively, on which outer and inner hinges are disposed 390, 400, and to which hinged platform 360 is pivotally connected. The upper surface 360a of the hinged platform is preferably slip resistant diamond plate. Alternatively, the step may be provided with a non-slip surface coating or material.

As noted, the planar plate 310 includes an interior ledge 345. This ledge is integral with and runs substantially the entire width of the interior end 340. It is received and captured by the angled stop 260 when the step is in the extended and/or deployed positions (FIGS. 5–7). Additionally, extending between the ends of inner and outer arms 370 and 380 is a shelf 430 which supports hinged platform 360 in the deployed position (FIGS. 6 and 7) and which serves as a barrier to prevent debris from entering the pocket step box 110 when the tailgate is down but the step is in the stored position (FIGS. 2C and 4). As may be seen in FIGS. 6 and 7, when the step is extended from the pocket step box, it may be tipped downwardly over the outermost roller 460 of a plurality of rollers so that it rests upon the step support ramp 250 and so that interior ledge 345 inserts into angled stop 260 and is there held firmly in place.

The pocket step further includes retention means to keep the step portion in the stored position until extension and deployment are desired. Such retention means preferably comprises a spring biased locking pin 440 which engages surface structure 450 on inner side 330 or inner arm 380. The structure is preferably an angled portion of the inner side or arm which creates a recess into which the locking pin fully extends.

To facilitate easy deployment of the step portion, one or more rollers 460 may be operatively mounted on the bottom side 170 of the pocket step box 110 and positioned immediately underneath the step portion 300. To minimize noise induced by contact between the step portion and the rollers when traveling, the rollers are preferably rubber and mounted on finely machined bearings.

Referring now to FIGS. 8–12, in a second preferred embodiment of the present invention, 500, plate 510 may be provided with two or more hinged platforms 520, 530, operable and deployable in the same fashion as the above-described first preferred embodiment. These views also show alternative means for sliding the pocket step plate in and out of the pocket step box 540. In this embodiment, the pocket step box is configured as in the first preferred embodiment, but further includes opposing outboard and inboard sides 550, 560, each of which include a slot 550a, 560a, that accommodates and accepts the planar outboard and inboard sides 570, 580, respectively, of plate 510.

The interior end 590 of plate 510 includes a downwardly depending ledge 600 and a tab 610, which engage the upper and lower rims 620, 630 of the pocket step box when deployed. Thus the rims function as step retention means, and further define the angle at which the step is disposed on deployment. The step assembly includes two sets of outer and inner hinges 640a, 640b, and 650a, 650b pivotally connecting the deployable platforms 520, 530 to the plate 510. The outer end 660 includes a shelf 670 to support the lower platform 530, while the upper platform 520 is supported by a transverse bar 680 extending across the plate.

FIG. 13 shows an alternative installation 700 for the first preferred embodiment of the present invention. In this view, first and second pocket steps 710, 720 are installed in the sides of the top of the tailgate 150. This installation would also prevent interference with the latch assembly of the tailgate, and it would further allow for use even with a trailer hitched to the truck.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A tailgate pocket step, comprising:
   a pocket step box having a top side, a bottom side, an inboard side, an outboard side, a back side, and a front side having an opening;
   a step member assembly having a stored position and a deployed position and including a substantially planar plate slidably insertable into said pocket step box through said opening in said front side, said planar plate including an outer side, an inner side, an interior end, and an exterior end, and at least one hinged platform pivotally connected to said planar plate and which is coplanar with said planar plate when said step assembly is in the stored position and which angles outwardly from said planar plate when said step assembly is in the deployed position so as to provide a step; and
   storage retention means to keep said step member assembly in the stored position until extension and deployment are desired;
   wherein said planar plate includes surface structure, and said storage retention means comprises a spring biased locking pin which engages said surface structure on said planar plate.

2. The apparatus of claim 1, wherein said planar plate includes:
   outer and inner arms;
   outer and inner hinges disposed on said outer and inner arms; and
   wherein said at least one hinged platform is pivotally connected to said planar plate with said outer and inner hinges.

3. The apparatus of claim 1, wherein said front side includes an upper rim and lower rim defining the opening in said front side.

4. The apparatus of claim 3, wherein said lower rim comprises an integral angled extension of said bottom side of said pocket step box, and further includes a step support ramp to support the planar plate when deployed.

5. The apparatus of claim 3, wherein said planar plate includes an interior ledge, and wherein said upper rim comprises an integral angled extension substantially perpendicular to said top side of said pocket step box and which encloses an angled stop channel for capturing said ledge when said step member assembly is deployed.

6. A tailgate pocket step comprising:
   a pocket step box having a top side, a bottom side, an inboard side, an outboard side, a back side, and a front side having an opening;
   a step member assembly having a stored position and a deployed position and including a substantially planar plate slidably insertable into said pocket step box through said opening in said front side, said planar plate including an outer side, an inner side, an interior end, and an exterior end, and at least one hinged platform pivotally connected to said planar plate and which is coplanar with said planar plate when said step assembly is in the stored position and which angles outwardly from said planar plate when said step assembly is in the deployed position so as to provide a step;
   wherein said planar plate includes outer and inner arms, and outer and inner hinges disposed on said outer and inner arms and said at least one hinged platform is pivotally connected to said planar plate with said outer and inner hinges; and
   wherein said planar plate further includes a shelf for supporting said hinged platform when said step member assembly is in the deployed position and for preventing debris from entering said pocket step box when said step member assembly is in the stored position.

7. A tailgate pocket step, comprising:
   a pocket step box having a top side, a bottom side, an inboard side, an outboard side, a back side, and a front side having an opening;
   a step member assembly having a stored position and a deployed position and including a substantially planar plate slidably insertable into said pocket step box through said opening in said front side, said planar plate including an outer side, an inner side, an interior end, and an exterior end, and at least one hinged platform pivotally connected to said planar plate and which is coplanar with said planar plate when said step assembly is in the stored position and which angles outwardly from said planar plate when said step assembly is in the deployed position so as to provide a step; and wherein said pocket step box includes at least one roller operatively mounted on said bottom side and positioned immediately underneath said planar plate.

8. The apparatus of claim 7, including two hinged platforms.

9. The apparatus of claim 7, wherein said inboard and outboard sides of said pocket step box include slots that slidably accept said planar plate.

10. The apparatus of claim 9, wherein said front end of said pocket step box includes an upper rim and a lower rim, and wherein said interior end of said planar plate includes a downwardly depending ledge and a tab which engage said upper and lower rims when said pocket step assembly is deployed.

11. The apparatus of claim 7, further including retention means for preventing said pocket step assembly from full egress from said box when deployed.

12. The apparatus of claim 11, wherein said retention means comprises a ledge disposed proximate said interior end of said planar plate and an angled stop channel in said pocket member box, such that when said step member assembly is deployed, said ledge is inserted into said angled stop channel.

13. The apparatus of claim 7, wherein said step member assembly includes two hinged platforms.

* * * * *